United States Patent
Phang et al.

(10) Patent No.: US 7,096,025 B2
(45) Date of Patent: Aug. 22, 2006

(54) COMMUNICATION DEVICE AND METHOD OF OPERATION THEREFORE

(75) Inventors: Wayne M. Phang, Coral Springs, FL (US); Branko Avanic, Miami, FL (US); Hiep T. Dang, Coconut Creek, FL (US); Joseph J. Medvid, Weston, FL (US); Dang N Vu, Parkland, FL (US); Kevin D. Walkup, Miramar, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/733,661

(22) Filed: Dec. 11, 2003

(65) Prior Publication Data

US 2005/0130683 A1    Jun. 16, 2005

(51) Int. Cl.
*H04Q 7/20* (2006.01)
(52) U.S. Cl. ...................... 455/445; 455/455; 455/466; 455/426.1; 455/518; 455/552.1; 455/553.1
(58) Field of Classification Search ........ 455/462–464, 455/426.1, 553.1, 127.4, 140, 414.1, 421, 455/517–520, 552.1, 3.05, 41.2, 521, 445; 379/207.06, 207.07, 215.01, 201.01
See application file for complete search history.

(56) References Cited

U.S. PATENT DOCUMENTS

| | | | | |
|---|---|---|---|---|
| 4,876,708 A | * | 10/1989 | Saegusa et al. | 455/462 |
| 5,666,364 A | * | 9/1997 | Pierce et al. | 455/518 |
| 5,832,386 A | * | 11/1998 | Nojima et al. | 455/421 |
| 5,995,830 A | * | 11/1999 | Amin et al. | 455/421 |
| 6,078,822 A | * | 6/2000 | Tsujita | 455/552.1 |
| 6,690,943 B1 | * | 2/2004 | Forde et al. | 455/518 |
| 2002/0107036 A1 | * | 8/2002 | Cannon et al. | 455/462 |
| 2005/0032475 A1 | * | 2/2005 | Mauney et al. | 455/552.1 |

* cited by examiner

*Primary Examiner*—Charles N Appiah
*Assistant Examiner*—Olivia Marie Marsh
(74) *Attorney, Agent, or Firm*—Randi L. Karpinia; Daniel C. Crilly

(57) ABSTRACT

A communication device (105,200) includes a cordless telephone (205) and a two way radio (210). The communication device (105,200) is adapted to place an active cordless telephone call in a low frequency mode in response to receiving an incoming two way radio communication. The communication device (105,200) is adapted to then establish communication within the two way radio communication. The communication device (105,200) periodically re-establishes the cordless telephone call to maintain communication with a cordless base station (120) until the two way radio communication is completed.

20 Claims, 3 Drawing Sheets

COMMUNICATION DEVICE AND METHOD OF OPERATION THEREFORE

BACKGROUND OF THE INVENTION

1. Field of the Invention

The present invention is generally related to communication devices and more particularly to an improved communication device for providing both two way radio and cordless telephone services.

2. Description of the Related Art

In the prior art, cordless telephones typically are used in the home to allow the user to place and receive telephone calls at any point throughout the house. A cordless telephone system typically includes a portable cordless handset and a cordless base station connected to a telephone company phone system by telephone landlines. The cordless base station has an assigned landline telephone number that allows the user to place and receive calls using the cordless portable handset within a limited range of the cordless base station, such as in a home. However, due to in its limited range, the cordless portable handset provides the user with relatively local radiotelephone communication. Further, a cordless telephone call is used generally for one to one communication via the landline communication system with limited capabilities for multi-device communication using conference calling options.

Radiotelephone communication outside the range of the cordless telephone system can be provided to a user via a two way radio system. A two way radio system typically includes a plurality of two way radio handsets communicating directly together on the same radio channel. When a user of a two way radio handset initiates a communication, the communication is transmitted to all the other two way radio handsets assigned to the same radio channel. In this manner, multiple handsets can communicate directly to each other.

Recently, some cordless telephones have been developed with handset to handset capability. These units do not provide group talk, but instead provide limited telephone inter-connect and one to one, full duplex radio capability.

Further, some new communication devices combine the mobility of a cordless telephone system with the immediacy of a two way radio system. Such combined devices provide accessibility to outside callers while staying in immediate contact with internal operations. In two-way radio mode, these devices provide instant communication with others utilizing two way radios on the same radio channel at the push of a button. In cordless telephone mode, these devices have similar functionality to standard landline telephones.

BRIEF DESCRIPTION OF THE DRAWINGS

The accompanying figures, where like reference numerals refer to identical or functionally similar elements throughout the separate views and which together with the detailed description below, are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but rather should be interpreted merely as a basis for the claims and as a representative basis for teaching one skilled in the art to variously employ the present invention in virtually any appropriately detailed structure. Further, the terms and phrases used herein are not intended to be limiting; but rather are intended to provide an understandable description of the invention.

The terms "a" or "an," as used herein, are defined as one or more than one. The term "plurality," as used herein, is defined as two or more. The term "another" as used herein, is defined as at least a second or more. The terms "including" and/or "having" as used herein, are defined as comprising (i.e., open language). The term "coupled" as used herein, is defined as connected, although not necessarily directly, and not necessarily mechanically. The terms "program," "software application," and the like, as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

Figure 1:
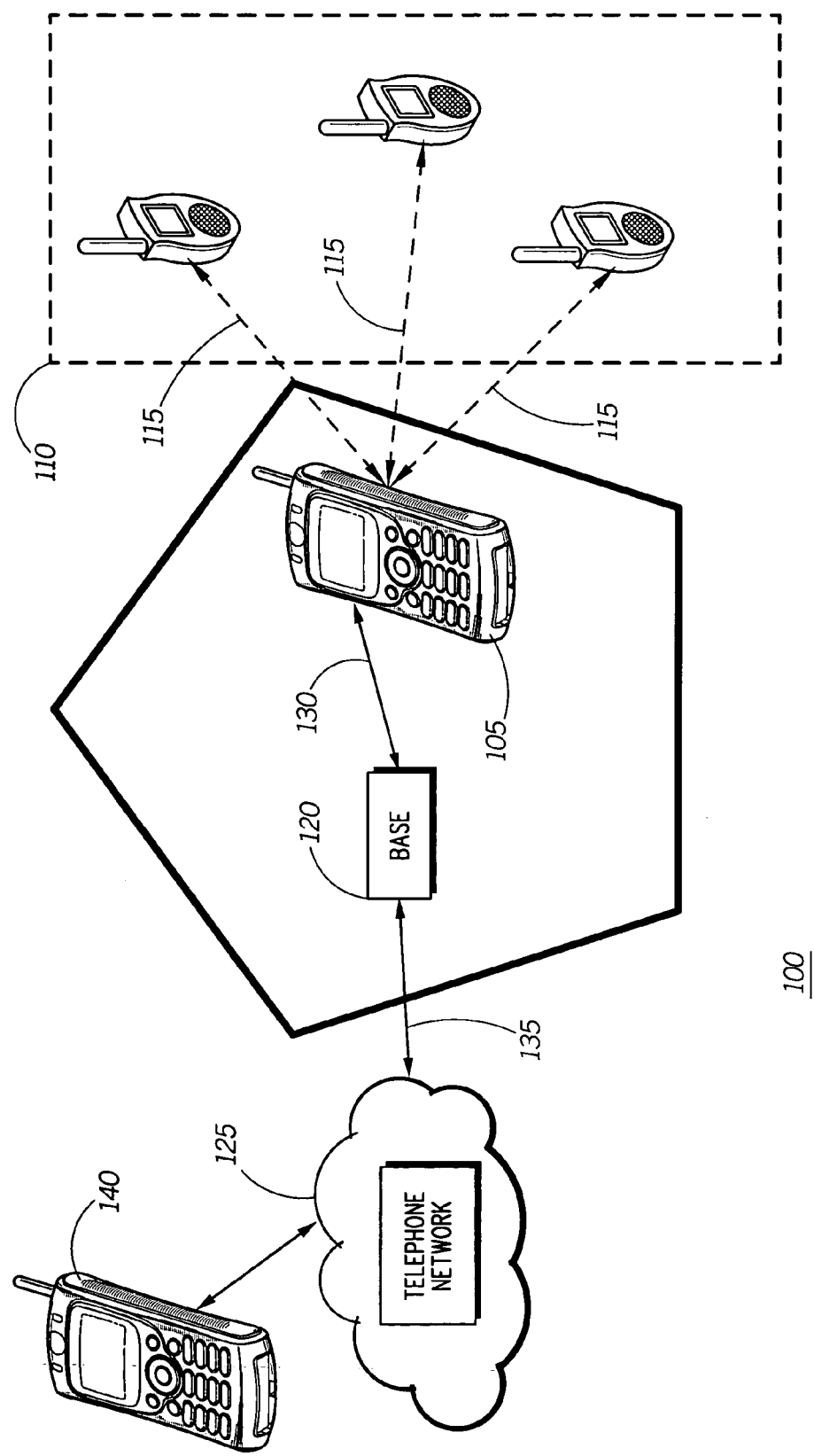
FIG. 1 is a block diagram of a system for cordless and two way radio communication.

FIG. 1 is a generalized block diagram of a system 100 for cordless end two way radio communication. A communication device 105, as illustrated, has the capability to communicate with a plurality of conventional two way radio handsets 110 using conventional two way radio channels 115. The two way radio channels, for example, can be within the UHF (ultra high frequency) range. The communication device 105, for example, can monitor the two way radio channels 115 for channel activity. (i.e., a user can listen to others transmitting within the two way radio channels 115). The communication device 105 can further transmit to the two way radio handsets 110 over the two way radio channels 115. (i.e., a user can depress a push-to-talk button and speak into a microphone of the communication device).

The communication device 105 further has capability to communicate with and place radiotelephone calls via a cordless base station 120, which provides private telephone line interconnection to a conventional telephone network 125. As is well known in the art, the cordless base station 120 and the communication device 105 together provide the limited range radio service conventionally known as cordless telephone service. The cordless base station 120 is designed to provide telephone interconnect to the user's landline telephone line (i.e. home or office telephone line) when the user has the communication device 105 within the radio range of the cordless base station 120. Such cordless service conventionally utilizes radio frequency channels in the VHF (very high frequency) or UHF (ultra high frequency) radio frequency bands. Recently, cordless telephone systems are further using the GHZ (Gigahertz) frequency bands. For example, the communication device 105 can communicate with the cordless base station 120 on a 2.4 GHz frequency band. When a cordless telephone call is active, a telephone link 135 is established between the cordless base station 120 and the telephone network 125; and a communication link 130 is established between the cordless base station 120 and the communication device 105. In this manner, the user of the communication device 105 can communicate via the cordless base station 120 and the telephone network 125 to another device 140.

Figure 2:
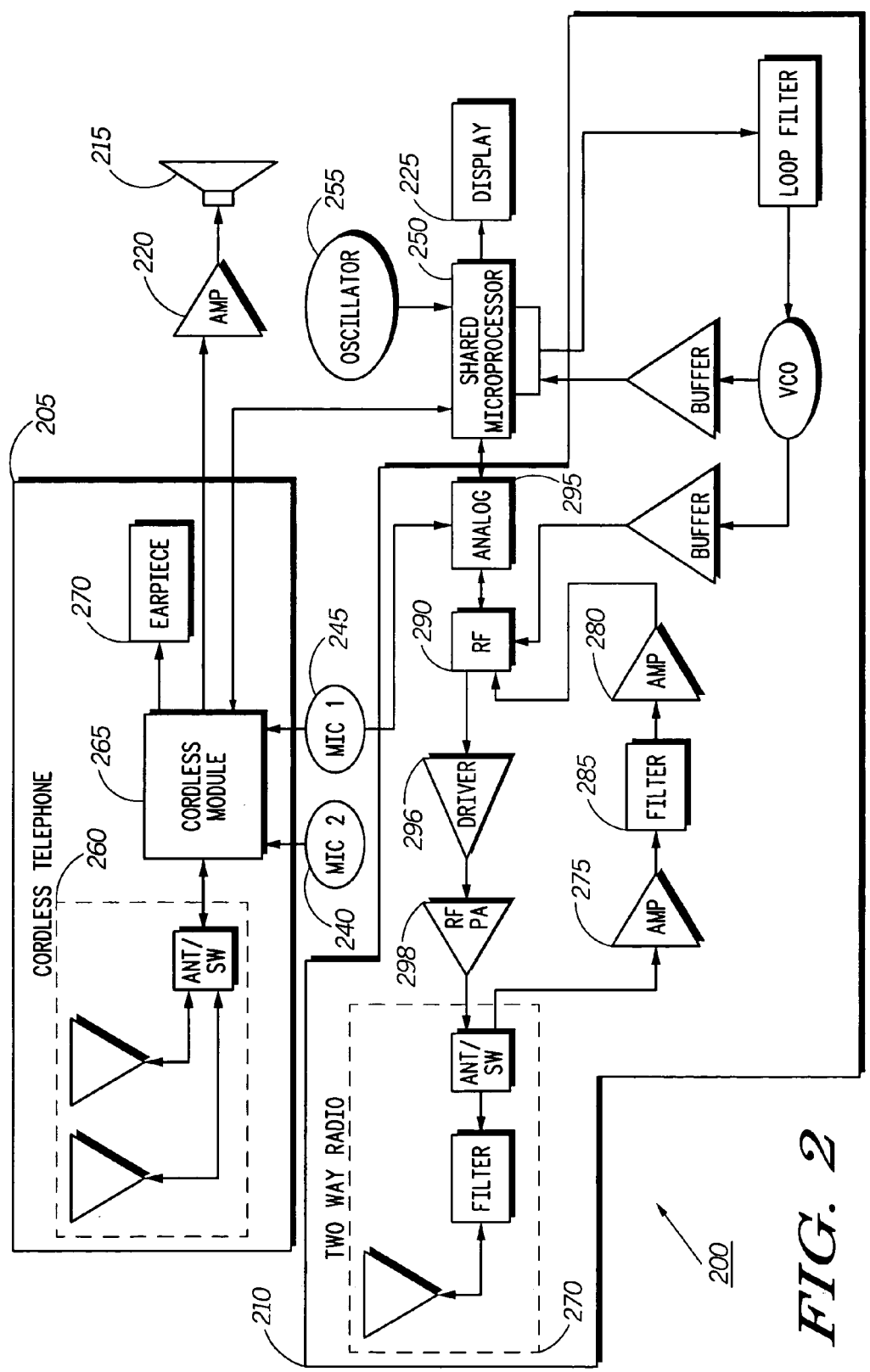
FIG. 2 is a block diagram of a device for cordless and two way radio communication for operation within the system of FIG. 1.

FIG. 2 is a block diagram of one embodiment of a device for cordless and two way radio communication for operation within the system 100 of FIG. 1. For example, the device 200 can be the communication device 105 of FIG. 1. Preferably, as illustrated, the device 200 comprises a cordless telephone 205 and a two way radio 210, along with various other elements required for the functionality of the device 200 such as a speaker 215 and associated circuitry 220, a display 225, one or more microphones 240,245, and a shared microprocessor 250 with associated crystal oscillator 255.

As illustrated in FIG. 2, the cordless telephone 205 includes one or more antennas 260 and associated circuitry for communicating within a cordless telephone system. For example, the antennas 260 can transmit and receive cordless calls over the communication link 130 (see FIG. 1) established between the cordless base station 120 (see FIG. 1) and the device 200. The antennas 260 are operatively coupled to a cordless module 265, which includes functional circuits and software for operating the cordless telephone 205. The cordless module 265, for example, can include a conventional cordless telephone transceiver, a cordless phone microprocessor, a memory, and the like, as is well known in the art. An earpiece 270 is coupled to the cordless module 265 for outputting audio communications for the user to hear. The speaker 215 and associated speaker circuitry 220 are further coupled to the cordless module 265 for outputting audio communications for the user as well. The speaker 215 and/or the earpiece 270 receive electrical signals from the cordless module 265 and convert them into sound. The microphones 240,245 are further coupled to the cordless module 265 for receiving audio inputs from a user of the device 200. Each of the microphones 240,245 changes the sound waves from a user's voice into electrical signals that are sent to the cordless module 265.

As illustrated in FIG.2, the two way radio 210 includes one or more antennas 270 and associated circuitry to transmit and receive signals on one or more two way radio channels 115 (see FIG. 1) for communication with one or more two way radio handsets 110. As illustrated, the two way radio 210 includes various circuits coupled together to provide two way radio operation as is well known in The art. For example, received two way radio signals are processed through the antennas 270 and associated circuitry, one or more amps 275,280 and one or more filters 285 to a radio frequency (RF) circuit 290 and an analog circuit 295, and are finally processed by the shared microprocessor 250. Similarly, communications for transmission from the two way radio 210 are processed from the microphone 245 through the analog circuit 295, the RF circuit 290, one or more drivers 296, one or more power amplifiers 298 and sent via the antennas 270 and associated circuitry. Such two way radio communications are well known in the art and are thus presented in generalities for simplicity purposes herein.

In accordance with a preferred embodiment of the present invention, the shared microprocessor 250 is adapted to perform various services associated with both the cordless telephone 205 and the two way radio 210. Preferably, various ergonomic functions of the device 200, including the interface between the cordless telephone 205 and the two way radio 210, are controlled by the shared microprocessor 250.

Preferably, the shared microprocessor 250 is coupled to the display 225 using standard input and output drivers as are known in the art. The display 225 provides visual information by displaying data such as one or more communication messages, phone numbers, caller identifications, graphic images, text entries, and the like. It will be appreciated by those of ordinary skill in the art that the display 225 can be a liquid crystal display, a cathode ray tube display, one or more organic light emitting diodes, one or more LEDs, a plasma display, or an equivalent.

By combining the two-way radio 210 operating at UHF frequencies and the cordless telephone 205 operating at 24GHz, there are conditions under which the cordless telephone 205 can create RF interference wit the two-way radio operation. One such instance is when a call on the cordless telephone 205 is placed on hold so tat the user can communicate on the two-way radio 210. In typical cordless telephone systems, the communication device 105 maintains a full duplex communication link with the cordless base station 120 even when the call is placed on hold. The switching between reception and transmission, and the pulsing of the RF on the cordless telephone due to the use of a Time Division Duplex (TDD) channel, can introduce noise into the two-way transmitter circuit (VCO, PLL. etc.) resulting in excessive transmit audio noise and distorted audio as heard by the receiving two way radio (i.e., one of the two way radio handsets 110).

In accordance with the present invention, the shared microprocessor 250 is adapted to instruct the cordless module 265 to place the call On hold, and the cordless module 265 is adapted to place the cordless telephone 205 in a low RF mode in response to such instruction in order to eliminate the two-way transmit noise associated with both the cordless telephone 205 and the two way radio 210 being simultaneously active. This mode stops the device 200 from maintaining a fuil duplex communication link 130 with the cordless base station 120 when a call is placed on hold If the cordless telephone 205 in the device 200 no longer transmits to the cordless base station 120, no TDD noise is generated from the cordless telephone 205 that would degrade the transmit audio of the two way radio 210.

Figure 3:
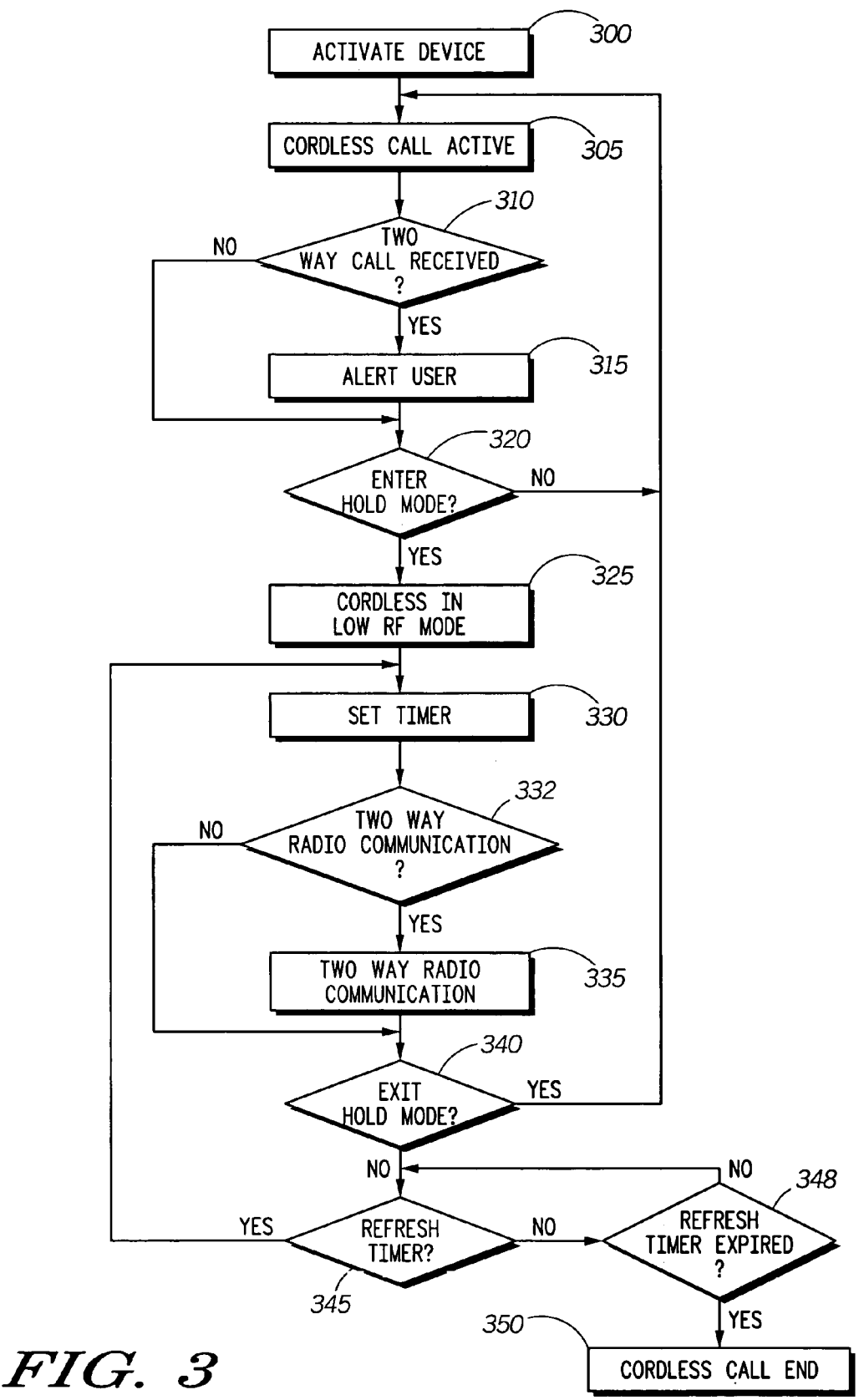
FIG. 3 is a flow chart for the process used by the device of FIG. 2 for processing a cordless telephone call and a two way radio communication.

FIG. 3 is a flow chart illustrating the process used by the wireless communication device 200 of FIG. 2 for processing a cordless telephone call and a two way radio communication. Specifically, FIG. 3 illustrates the operation of the device 200 in maintaining an active cordless communication and an active two way communication simultaneously. As illustrated in FIG. 3, the operation begins with the activation of the device 200. For example, the device 200 is activated by a user turning on the device 200 using a power button. Next, in Step 305, a call is presumed to be in process on the cordless telephone system. Next, in Step 310, the operation queries for receipt of a two way radio communication. When a two way radio communication is detected in Step 310, the operation continues with Step 315 in which the user is alerted of the incoming call on the two way radio system. For example, a short audible alert sent via the speaker 215 or the earpiece 270 can be used to alert the user. Similarly, a visual alert displayed on the display 225 can be used to alert the user. Next, or when no two way radio communication is detected in Step 310, the operation continues with Step 320, wherein the operation determines whether or not to enter a hold mode. For example, the shared microprocessor 250 can include predetermined instructions to automatically enter hold mode when a two way radio communication is received during an active cordless telephone communication. Alternatively, the shared microprocessor 250 can be programmed to query the user and the user can choose to enter the hold mode by pressing a button, soft key, or other manual user input. When hold mode is not entered in Step 320, the operation cycles back to Step 305 in which the cordless telephone communication continues.

When hold mode is entered in Step 320, the operation continues to Step 325 in which the cordless telephone 205 is placed in a low RF mode (also referred to as "hold mode"). For example, the shared microprocessor 250 sends a command to the cordless module 265 to place the cordless telephone 205 in low RF mode. The hold mode operation is then controlled by the cordless phone protocol which can be contained within the software on the cordless module 265. Hold mode operation includes stopping the cordless telephone 205 from transmitting at b 2.4 GHz, thereby placing the cordless telephone in a receive-only mode. In hold mode, the telephone link 135 is maintained between the cordless base station 120 and the telephone network 125. The cordless base station 120 is instructed by the device 200 to hold the line. With the line on hold, the cordless base station 120 sends only a broadcast message to the device 200 to maintain the communication link 130. The device 200 receives the messages from the cordless base station 120. but does not transmit. In the hold mode of Step 325, the microphone 240, the earpiece 270, and/or the speaker 215 can be placed in mute operation if such a preference has been set by the user.

Next, in Step 330, a timer is set. The timer is used to keep the line on hold up to a set time frame (determined by the software) unless instructed by the device 200 to resume the call. This is necessary since without a constant link between the device 200 and the cordless base station 120, the cordless base station 120 will not know if the device 200 goes out of range and will hold the line indefinitely.

Next, in Step 332, it is determined whether or not two way radio communication is desired/required. When two way radio communication is desired/required in Step 332, the operation then continues to Step 335 in which the two way radio communication 335 is established. Next, or when two way radio communication is not desired/required in Step 332, the operation continues with Step 340, in which the operation queries for an input to exit the hold mode. For example, a user can press a button to terminate to hold mode. Pressing a resume key on the device 200 can return the unit to normal cordless telephone connection, including the cordless telephone 205 exiting the low-traffic RF connection mode and returning to the normal cordless telephone connection mode. When an input to exit the hold mode is detected in Step 340, the operation cycles back to Step 305 in which the cordless communication is once again set to be fully active. In one embodiment (not shown), the device 200 may be out of range of the cordless base station 120 when the input to exit hold mode is detected. In this embodiment, the device 200 will be unable to re-establish the cordless telephone connection (i.e., the communication link 130) and can notify the user of the out of range situation. For example, an out of range icon can be displayed on the display 225.

When an input to exit the hold mode is not detected in Step 340, the operation continues to Step 345 in which the operation queries for refreshing of the timer. For example, to extend the time which the cordless base station 120 keeps the line on hold if the device 200 is within range, the cordless module 265 can be instructed (by the cordless module's processor, the shared processor, a user input, or the like) to send a short momentary instruction to the cordless base station 120 to resume the cordless call then immediately place the cordless call back on hold again just before the cordless base station 120 disconnects the line. When the timer is refreshed in Step 345, the operation cycles back to Step 330 in which the "on hold" timer is reset on the cordless base station 120. Using a periodic timer for resetting the connection provides the additional benefit that the cordless communication can be maintained even when the device 200 is moved periodically out of range of the cordless base station 120 as long as the device 200 is in-range at the time which the timer is refreshed.

When the timer is not refreshed in Step 345, the operation continues to Step 348 in which the operation determines whether or not the refresh timer has expired. When the refresh timer has not expired, the operation cycles back to Step 345 and periodically checks for refreshing of the timer. When the refresh timer has expired in Step 348, the operation continues with Step 350 in which the cordless base station 120 goes on-hook to disconnect the telephone link 135 between the cordless base station 120 and the telephone network 125. In other words, the cordless call is terminated when no instruction is received from the handset after a predetermined timeframe The invention as described herein provides a system and method for disabling a full duplex communication link between the communication device (105, 200) and the cordless base station 120 when a cordless call is placed on hold while maintaining a full duplex telephone link 135 between the cordless base station 120 and the telephone network 125. Without use of such a the "low RF mode," it is very difficult to isolate the RF coupling of the TDD noise generated by the cordless telephone from the two-way radio during transmissions. The present invention as described herein provides a novel system and method to place a call on hold including: stopping the handset from transmitting at 2.4 GHz when a call was placed on hold, terminating the call if no instruction is received from the handset after a predetermined timeframe, and keeping the call on hold if the handset is within range of the base unit after the predetermined "on hold" time is expired.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of operation of a communication device, the method comprising:

communicating within a cordless telephone call over a first wireless communication link of a cordless telephone system;

receiving an incoming group call over a second wireless communication link of a two way radio system that is independent of the cordless telephone system, the second wireless communication link being operable to support simultaneous communication between the communication device and a plurality of additional communication devices;

placing the cordless telephone call in a hold mode so as to mitigate interference on the second wireless communication link; and establishing communication within the group call while the cordless telephone call is in the hold mode without utilizing the cordless telephone system.

2. The method of claim 1, further comprising:

notifying a user of the communication device in response to receiving the incoming group call.

3. The method of claim 1, further comprising:

querying a user of the communication device for hold mode activation in response to receiving the incoming group call; and receiving an input instruction from the user to enter the hold mode in response to the query.

4. The method of claim 1, wherein the step of placing the cordless telephone call in a hold mode comprises:

ceasing transmission over the first wireless communication link.

5. The method of claim 4, wherein the step of placing the cordless telephone call in hold mode further comprises:

instructing a cordless base station to place the cordless telephone call on hold prior to ceasing transmission over the first wireless link.

6. The method of claim 4, wherein the step of placing the cordless telephone call in a hold mode further comprises:

receiving one or more broadcast messages from a cordless base station over the first wireless communication link.

7. The method of claim 1, further comprising:

receiving a user input to terminate the hold mode; and resuming the cordless telephone call in response to the user input.

8. The method of claim 1, further comprising:

receiving a user input to exit the hold mode;

determining whether the communication device is within range of a cordless base station servicing the first wireless communication link; and notifying the user responsive to the user input in the event that the communication device is out of range of the cordless base station.

9. The method of claim 1, further comprising:

setting a timer; and resuming the cordless telephone call upon expiration of the timer.

10. The method of claim 9, further comprising:

placing the cordless telephone call back into the hold mode immediately after resuming the cordless telephone call; and resetting the timer.

11. A communication device comprising:

a two way radio section for communicating within a group call over a first wireless communication link of a two way radio system, the first wireless communication link being operable to support simultaneous communication between the communication device and a plurality of additional communication devices;

a cordless telephone section for communicating within a cordless telephone call over a second wireless communication link of a cordless telephone system that is independent of the two way radio system, wherein the cordless telephone section is independent of the two way radio section, and a processor coupled the two way radio section and the cordless telephone section, operable to place the cordless telephone call in a hold mode so as to mitigate interference on the first wireless communication link while the two way radio section is communicating within the group call.

12. The communication device as recited in claim 11, wherein the two way radio section includes a radio frequency (RF) circuit and wherein the cordless telephone section includes a cordless telephone transceiver that is independent of the RF circuit.

13. The communication device as recited in claim 12, further comprising:

a user input for receiving a user instruction to place the cordless telephone call in the hold mode.

14. The communication device as recited in claim 11, wherein the cordless telephone section is responsive to the processor to cease transmission over the second wireless communication link when the cordless telephone call is in the bold mode.

15. The communication device as recited in claim 14, wherein the cordless telephone section is adapted to receive one or more broadcast messages from a cordless base station when the cordless telephone call is in the hold mode.

16. The communication device as recited in claim 11, wherein the cordless telephone section includes a timer for establishing a time frame for maintaining the cordless telephone call in the hold mode.

17. A wireless communication system facilitating cordless telephone communications and two-way group communications, the cordless telephone communications being routed over a landline telephone network, the wireless communication system comprising:

a wireless communication device including:

a two way radio section for communicating within a two-way group call over a first wireless communication link of a two way radio system, the first wireless communication link being operable to support simultaneous communication between the wireless communication device and a plurality of additional wireless communication devices; and a cordless telephone section for communicating within a cordless telephone call over a second wireless communication link of a cordless telephone system that is independent of the two way radio system; and a processor, coupled to the two way radio section and the cordless telephone section, operable to place the cordless telephone call in a hold mode so as to mitigate interference on the first wireless communication link while the two way radio section is communicating within the group call; and a cordless base station supporting the cordless telephone call over the second wireless communication link, but not supporting the two-way group call over the first wireless communication link, the cordless base station interfacing the cordless telephone call between the wireless communication device and the landline telephone network.

18. The wireless communication system of claim 17, wherein the cordless telephone section of the wireless communication device is responsive to the processor to cease transmission ova the second wireless communication link when the cordless telephone call is in the hold mode.

19. The wireless communication system of claim 18, wherein the cordless telephone section of the wireless communication device is adapted to receive one or more broadcast messages from the cordless base station when the cordless telephone call is in the hold mode.

20. The wireless communication system of claim 17, wherein the two way radio section includes a radio frequency (RF) circuit and wherein the cordless telephone section includes a cordless telephone transceiver that is independent of the RF circuit.

\* \* \* \* \*